US012665120B2

(12) United States Patent
Murashita et al.

(10) Patent No.: US 12,665,120 B2
(45) Date of Patent: Jun. 23, 2026

(54) REACTOR, CONVERTER, AND POWER CONVERSION DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Masaya Murashita, Mie (JP); Kazuhiro Inaba, Mie (JP); Kohei Yoshikawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 952 days.

(21) Appl. No.: 17/911,973

(22) PCT Filed: Mar. 24, 2021

(86) PCT No.: PCT/JP2021/012434
§ 371 (c)(1),
(2) Date: Sep. 15, 2022

(87) PCT Pub. No.: WO2021/193783
PCT Pub. Date: Sep. 30, 2021

(65) Prior Publication Data
US 2023/0141010 A1      May 11, 2023

(30) Foreign Application Priority Data

Mar. 27, 2020      (JP) ................................. 2020-059195

(51) Int. Cl.
*H01F 27/26* (2006.01)
*H01F 27/28* (2006.01)
*H02M 7/00* (2006.01)

(52) U.S. Cl.
CPC ............. *H01F 27/26* (2013.01); *H01F 27/28* (2013.01); *H02M 7/003* (2013.01)

(58) Field of Classification Search
CPC . H01F 27/26; H01F 27/28; H01F 3/10; H01F 3/14; H01F 37/00; H02M 7/003; H02M 3/158; H02M 3/003

(Continued)

(56) References Cited

U.S. PATENT DOCUMENTS 8,242,870 B1 * 8/2012 Folker ................... H01F 27/255
336/83
2005/0068149 A1 * 3/2005 Fushimi ................ H01F 27/306
336/208

(Continued)

FOREIGN PATENT DOCUMENTS

JP      S51-057218 U1      5/1976
JP      H0485908 A  *   3/1992
JP      2011-233596 A      11/2011

OTHER PUBLICATIONS

International Search Report issued on Jun. 22, 2021 for WO 2021/193783 A1 (4 pages).

*Primary Examiner* — Tuyen T Nguyen
(74) *Attorney, Agent, or Firm* — Venjuris, P.C.

(57) ABSTRACT

The magnetic core includes a middle core, a first end core, a second end core, a first side core, and a second side core. The first end core includes a first outer face separated from the first end face in an X direction, and a first recessed portion provided in the first outer face. In a plan view of the magnetic core from a Z direction, the first recessed portion is provided in a central portion, with respect to the Y (Continued)

direction, of the first end core. The X direction is a direction conforming to the axial direction of the middle core, the Y direction is a direction in which the middle core, the first side core, and the second side core are side-by-side, and the Z direction is a direction orthogonal to the X direction and the Y direction.

12 Claims, 8 Drawing Sheets

(58) Field of Classification Search
USPC .................................. 336/83, 212, 233–234
See application file for complete search history.

(56) References Cited

U.S. PATENT DOCUMENTS

2012/0256719 A1* 10/2012 Shudarek .............. H01F 38/023
336/179
2018/0122550 A1 5/2018 Inaba

* cited by examiner

WIDTH W1 OF FIRST RECESSED PORTION

WIDTH W1 OF FIRST RECESSED PORTION

DEPTH D1 OF FIRST RECESSED PORTION

DEPTH D1 OF FIRST RECESSED PORTION

REACTOR, CONVERTER, AND POWER CONVERSION DEVICE

CROSS REFERENCE TO RELATED APPLICATIONS

This application is a national phase of PCT application No. PCT/JP2021/012434, filed on 24 Mar. 2021, which claims priority from Japanese patent application No. 2020-059195, filed on 27 Mar. 2020, all of which are incorporated herein by reference.

TECHNICAL FIELD

The present disclosure relates to a reactor, a converter, and a power conversion device.

BACKGROUND

A reactor is a constituent component of a converter provided in a hybrid automobile or the like. Such a reactor includes a coil having a winding portion formed by winding a wire into a spiral, and a magnetic core combined with the coil. For example, a reactor that has one winding portion is disclosed in FIGS. 5 to 8 of Patent Document 1. The magnetic core of this reactor includes a middle core arranged inside the winding portion, side cores arranged outward of outer peripheral faces of the winding portion, and end cores arranged at end faces of the winding portion.

PRIOR ART DOCUMENT

Patent Document

Patent Document 1: JP 2016-201509 A

SUMMARY OF INVENTION

A reactor according to the present disclosure includes:
a coil including a first winding portion; and
a magnetic core,
wherein the magnetic core includes:
    a middle core arranged inside the first winding portion,
    a first end core facing a first end face of the first winding portion,
    a second end core facing a second end face of the first winding portion,
    a first side core that is arranged outward of a first side face of the first winding portion and connects the first end core and the second end core, and
    a second side core that is arranged outward of a second side face of the first winding portion and connects the first end core and the second end core,
the first end core includes:
    a first outer face separated from the first end face in an X direction, and
    a first recessed portion provided in the first outer face,
in a plan view of the magnetic core from a Z direction, the first recessed portion is located in a central portion of the first end core with respect to a Y direction,
the X direction is a direction conforming to an axial direction of the middle core,
the Y direction is a direction in which the middle core, the first side core, and the second side core are side-by-side, and
the Z direction is a direction orthogonal to the X direction and the Y direction.

A converter according to the present disclosure includes:
the reactor of the present disclosure.
A power conversion device according to the present disclosure includes:
the converter of the present disclosure.

DETAILED DESCRIPTION TO EXECUTE THE INVENTION

Technical Problem

Figure 1:
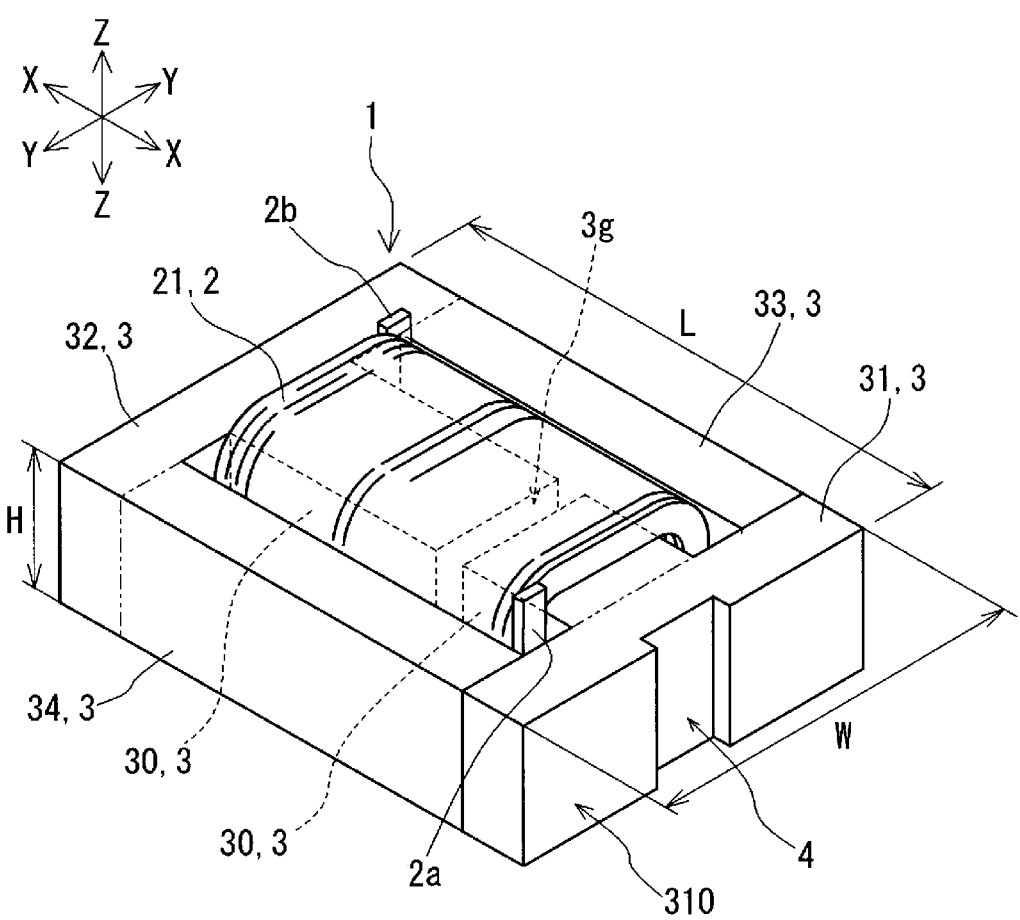
FIG. 1 is a schematic perspective view of a reactor according to a first embodiment.

Development in hybrid automobiles and the like has led to demand for reduction in the weight of reactors. However, if the size of the magnetic core is reduced in order to reduce the weight of a reactor, magnetic characteristics of the reactor deteriorate.

In view of this, an object of the present disclosure is to provide a reactor that is lightweight and has excellent magnetic characteristics. Another object of the present disclosure is to provide a converter that includes a reactor that is lightweight and has excellent magnetic characteristics, and a power conversion device.

Advantageous Effects of Present Disclosure

The reactor of the present disclosure is lightweight and has excellent magnetic characteristics. Also, the converter and the power conversion device of the present disclosure are lightweight and excellent in terms of conversion efficiency.

Description of Embodiments of Present Disclosure

First, embodiments of the present disclosure will be listed and described.
    <1> A reactor according to an embodiment includes:
    a coil including a first winding portion; and
    a magnetic core, wherein the magnetic core includes:

a middle core arranged inside the first winding portion, a first end core facing a first end face of the first winding portion, a second end core facing a second end face of the first winding portion, a first side core that is arranged outward of a first side face of the first winding portion and connects the first end core and the second end core, and a second side core that is arranged outward of a second side face of the first winding portion and connects the first end core and the second end core, the first end core includes:

a first outer face separated from the first end face in an X direction, and a first recessed portion provided in the first outer face, in a plan view of the magnetic core from a Z direction, the first recessed portion is located in a central portion of the first end core with respect to a Y direction, the X direction is a direction conforming to an axial direction of the middle core, the Y direction is a direction in which the middle core, the first side core, and the second side core are side-by-side, and the Z direction is a direction orthogonal to the X direction and the Y direction.

Due to providing the first recessed portion in the first end core, the amount of material constituting the first end core is reduced, and thus the weight of the reactor is lower than in the case where the first recessed portion is not provided.

The central portion, with respect to the Y direction, of the first outer face of the first end core is a portion through which magnetic flux is not likely to pass. Accordingly, due to providing the first recessed portion in the central portion, with respect to the Y direction, of the first outer face of the first end core, it is possible to suppress deterioration of the magnetic characteristics of the reactor caused by the provision of the first recessed portion in the magnetic core. Here, the central portion is a region of the first end core in the Y direction that is not overlapped with the side cores.

<2> In one aspect of the reactor according to the embodiment, in a plan view of the magnetic core from the Z direction, the first recessed portion fits within a range corresponding to the length of the middle core in the Y direction.

Due to the width of the first recessed portion being within the range of the width of the middle core, it is possible to easily suppress deterioration of the magnetic characteristics of the reactor caused by the provision of the first recessed portion in the magnetic core.

<3> In one aspect of the reactor according to the embodiment, the first recessed portion is shaped as a groove extending along the Z direction.

If the first recessed portion is shaped as a groove that extends in the Z direction, it is possible to easily suppress deterioration of the magnetic characteristics of the reactor even if the length of the first recessed portion in the Z direction is increased in order to the further reduce the volume of the first end core. This is because even if the length of the first recessed portion in the Z direction is increased, the first recessed portion remains in a portion of the first end core where magnetic flux is not likely to pass. If the first recessed portion were shaped as a groove that extends in the Y direction, and the length of the first recessed portion in the Y direction were increased, the size of the portion of the first end core through which a large amount of magnetic flux passes could possibly be reduced due to the first recessed portion.

<4> In one aspect of the reactor according to the embodiment, a cross-section of the first recessed portion orthogonal to the Z direction has a rectangular shape.

It is easy to form a first recessed portion having a rectangular or trapezoidal cross-sectional shape. Also, if the first end core is manufactured by being compressed in the X direction, it is possible to obtain an effect of facilitating removal of the first end core from the mold.

<5> In one aspect of the reactor according to the embodiment, the magnetic core includes a plurality of core pieces, one of the core pieces is a first core piece that includes at least the first end core, and the first core piece is a powder compact made of a raw material powder that contains a soft magnetic powder.

If the magnetic core is constituted by a plurality of core pieces, the magnetic core can be attached to the coil, which includes the winding portion, at a later time. Also, if the first core piece including the first end core that has the first recessed portion is a powder compact, deterioration of the magnetic characteristics of the magnetic core can be more easily suppressed than in the case where the first core piece is a compact made of a composite material.

<6> In one aspect of the reactor according to the embodiment, in a plan view of the magnetic core from the Z direction, the width of the first recessed portion in the Y direction is 5% or more and 50% or less of the length of the first end core in the Y direction.

If the width of the first recessed portion in the Y direction is 5% or more and 50% or less of the length of the first end core in the Y direction, the first recessed portion is not likely to be overlapped with a portion of the first end core through which a large amount of magnetic flux passes. Accordingly, deterioration of the magnetic characteristics of the reactor can be easily suppressed.

<7> In one aspect of the reactor according to the embodiment, in a plan view of the magnetic core from the Z direction, the width of the first recessed portion in the Y direction is 10% or more and 150% or less of the length of the middle core in the Y direction.

If the width of the first recessed portion in the Y direction is 10% or more and 150% or less of the length of the middle core in the Y direction, the first recessed portion is not likely to be overlapped with a portion of the first end core through which a large amount of magnetic flux passes. Accordingly, deterioration of the magnetic characteristics of the reactor can be easily suppressed.

<8> In one aspect of the reactor according to the embodiment, in a plan view of the magnetic core from the Z direction, the depth of the first recessed portion in the X direction is 10% or more and 125% or less of the length of the first end core in the X direction.

If the depth in the X direction of the first recessed portion is 10% or more and 125% or less of the length in the X direction of the first end core, the first recessed portion is not likely to be overlapped with a portion of the first end core through which a large amount of magnetic flux passes. Accordingly, deterioration of the magnetic characteristics of the reactor can be easily suppressed. Here, if the depth of the first recessed portion is 100% or more of the length of the first end core in the X direction, the first recessed portion extends to the middle core. In this case, the width of the first recessed portion needs to be less than the length of the middle core in the Y direction.

<9> In one aspect of the reactor according to the embodiment, the second end core includes:

a second outer face separated from the second end face in the X direction, and a second recessed portion provided in the second outer face, and in a plan view of the magnetic core from the Z direction, the second recessed portion is provided in a central portion of the second end core with respect to the Y direction.

Due to providing the second recessed portion in the second end core in addition to the first recessed portion provided in the first end core, the weight of the reactor is further reduced.

Here, a preferred configuration of the second recessed portion is the same as the preferred configuration of the first recessed portion. In other words, the preferable configuration of the second recessed portion can be obtained by replacing "first recessed portion" of the reactor described in aspects <2> to <8> with "second recessed portion".

<10> In one aspect of the reactor according to the embodiment, the coil further includes a second winding portion and a third winding portion, the first side core is arranged inside the second winding portion, and the second side core is arranged inside the third winding portion.

Reactors that are used for certain applications and have three winding portions tend to be heavy. Even in the case of such a reactor, the weight of the reactor is reduced by providing the first recessed portion in the first end core.

<11> A converter according to an embodiment includes:

the reactor according to any of aspects <1> to <10>.

The above converter includes a reactor that is lightweight and has excellent magnetic characteristics. Accordingly, the converter is lightweight and has excellent conversion efficiency.

<12> A power conversion device according to an embodiment includes:

the converter according to aspect <11>.

The above power conversion device includes a converter that is lightweight and has excellent conversion efficiency. Accordingly, the power conversion device is lightweight and has excellent conversion efficiency.

DETAILS OF EMBODIMENTS OF PRESENT DISCLOSURE

Hereinafter, embodiments of a reactor according to the present disclosure will be described with reference to the drawings. Like reference numerals in the figures indicate members having like names. It should be noted that the present invention is not limited to the configurations shown in the embodiments, but rather is indicated by the scope of claims, and is intended to include all modifications within a meaning and scope equivalent to the scope of claims.

First Embodiment

The configuration of a reactor 1 will be described in a first embodiment with reference to FIGS. 1 and 2. The reactor 1 shown in FIG. 1 is obtained by combining a coil 2 and a magnetic core 3. One of the features of the reactor 1 is that a first recessed portion 4 is provided in a portion of the magnetic core 3. Hereinafter, configurations provided in the reactor 1 will be described in detail.

1. Coil

Figure 2:
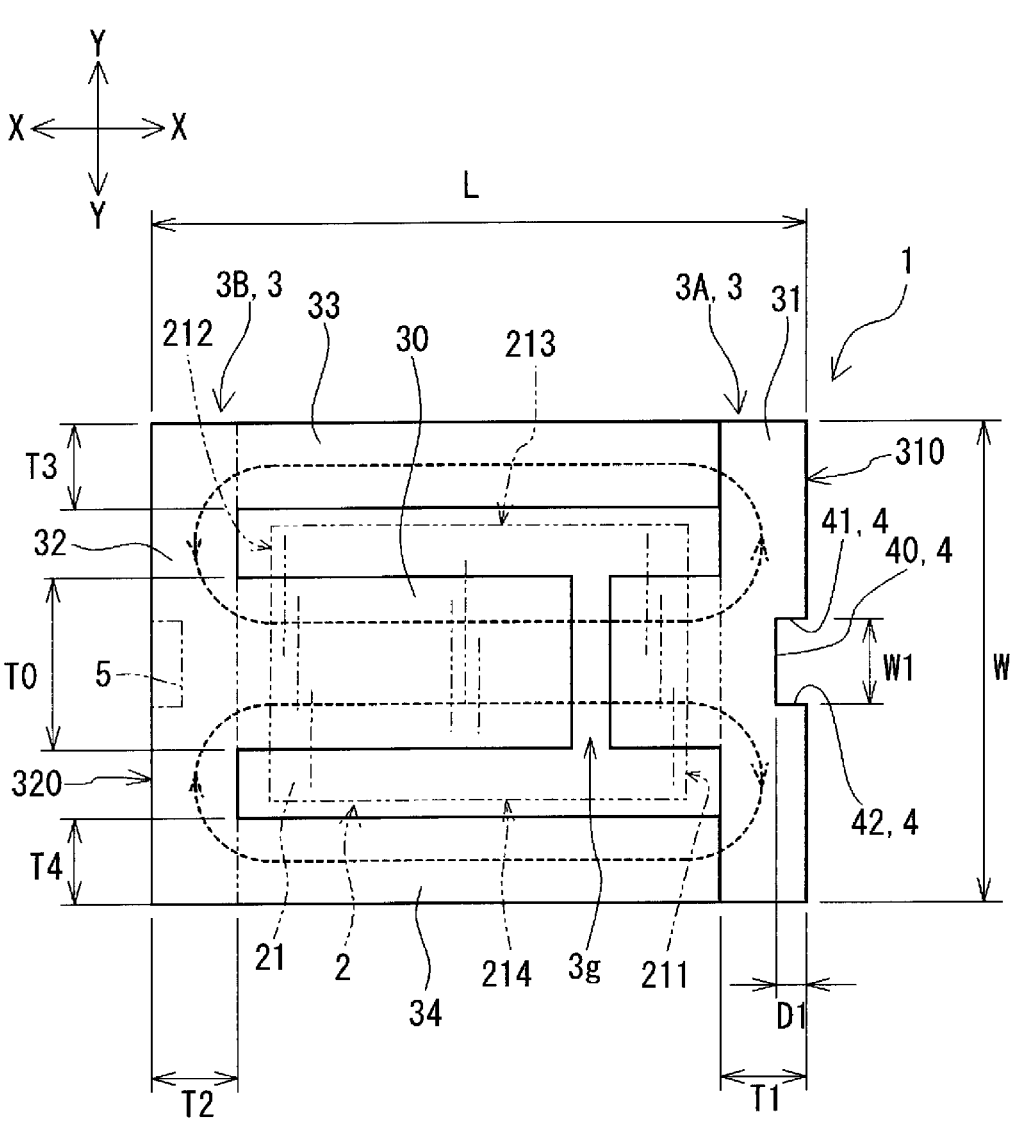
FIG. 2 is a top view of the reactor of FIG. 1.

The coil 2 includes one first winding portion 21 (FIGS. 1 and 2). The first winding portion 21 is constituted by one jointless coil wire that has been wound into a spiral. A known coil wire can be used as the coil wire. A covered flat wire is used as the coil wire in this embodiment. The conductor wire of the covered flat wire is constituted by a copper flat wire. The insulating coating of the covered flat wire is made of an enamel. The first winding portion 21 is constituted by an edgewise coil in which a covered flat wire has been wound edgewise.

The first winding portion 21 is shaped as a rectangular cylinder. The term "rectangular" includes a square. In other words, the end faces of the first winding portion 21 are shaped as a rectangular frame. Due to the first winding portion 21 being shaped as a rectangular cylinder, the area of contact between the first winding portion 21 and the installation target is likely to be larger than in the case where the winding portion is shaped as a cylinder having the same cross-sectional area. For this reason, heat generated by the reactor 1 can be easily dissipated to the installation target via the first winding portion 21. Moreover, the first winding portion 21 can be easily disposed stably on the installation target. The winding portion 21 has rounded corner portions.

An end portion 2a and an end portion 2b of the first winding portion 21 extend circumferentially outward from the first winding portion 21 on one end side and the other end side, respectively, in the axial direction of the first winding portion 21. At the end portion 2a and the end portion 2b of the first winding portion 21, the insulating coating has been peeled off to expose the conductor wire. A terminal member (not shown) is connected to each of the exposed portions of the conductor wire. An external device is connected to the coil 2 via the terminal members. The external device is not shown in the drawings. One example of the external device is a power source that supplies electric power to the coil 2.

2. Magnetic Core

As shown in FIG. 2, the magnetic core 3 includes a middle core 30, a first end core 31, a second end core 32, a first side core 33, and a second side core 34. In FIG. 2, the boundaries of the cores 30, 31, 32, 33, and 34 are shown by dashed double-dotted lines. The middle core 30 is a section of the magnetic core 3 that has a portion arranged inside the first winding portion 21. The first end core 31 is a portion of the magnetic core 3 that faces a first end face 211 of the first winding portion 21. The second end core 32 is a portion of the magnetic core 3 that faces a second end face 212 of the first winding portion 21. The first side core 33 is a portion of the magnetic core 3 that is arranged outward of a first side face 213 of the first winding portion 21. The second side core 34 is a portion of the magnetic core 3 that is arranged outward of a second side face 214 of the first winding portion 21.

In the magnetic core 3, an annular closed magnetic path shown by a bold dashed line is formed in the middle core 30, the first end core 31, the first side core 33, and the second end core 32. Also, an annular closed magnetic path shown by a bold dashed line is formed in the middle core 30, the first end core 31, the second side core 34, and the second end core 32.

Here, directions in the reactor 1 are defined based on the magnetic core 3. First, the direction along the axial direction of the middle core 30 is an X direction. A direction that is orthogonal to the X direction and is the direction in which the middle core 30, the first side core 33, and the second side core 34 are side-by-side is a Y direction. A direction that intersects both the X direction and the Y direction is a Z direction (FIG. 1).

2.1. Middle Core

The middle core 30 is a portion of the magnetic core 3 that is arranged inside the first winding portion 21 of the coil 2. Accordingly, the middle core 30 extends along the axial direction of the first winding portion 21. In this example, the two end portions of the magnetic core 3 along the axial direction of the first winding portion 21 respectively project from the end faces 211 and 212 of the first winding portion 21. The protruding portions are also portions of the middle core 30.

The shape of the middle core 30 is not particularly limited as long as it conforms to the shape of the interior of the first winding portion 21. The middle core 30 of this example has a substantially rectangular parallelepiped shape.

2.2. First End Core and Second End Core

The first end core 31 and the second end core 32 have a larger width in the Y direction than the first winding portion 21. Specifically, the first end core 31 projects outward in the Y direction from the first end face 211 of the first winding portion 21, and the second end core 32 projects outward in the Y direction from the second end face 212 of the first winding portion 21.

The shapes of the first end core 31 and the second end core 32 are not particularly limited as long as sufficient magnetic paths are formed inside the end cores 31 and 32. The first end core 31 and the second end core 32 of this example have a substantially rectangular parallelepiped shape. Among the four corner portions of the first end core 31 and the second end core 32 in a view from the Z direction, the two corner portions that are distant from the side cores 33 and 34 may be rounded. If these two corner portions are rounded, the weight of the end cores 31 and 32 is lowered. These two corner portions are portions where magnetic flux is not likely to flow. Therefore, even if these two corner portions are rounded, the magnetic characteristics of the reactor 1 are not likely to deteriorate.

The first end core 31 in this example includes the first recessed portion 4 provided in a first outer face 310 thereof. Out of the two faces of the first end core 31 that are orthogonal to the X direction, the first outer face 310 is the face that is distant from the middle core 30. The weight of the first end core 31 is lowered due to the first recessed portion 4. The first recessed portion 4 will be described in detail later.

2.3. First Side Core and Second Side Core

The first side core 33 connects the first end core 31 and the second end core 32 at a position outward of the first side face 213 of the first winding portion 21. The axial direction of the first side core 33 is parallel with the axial direction of the middle core 30. The first side face 213 is a face of the first winding portion 21 that faces the Y direction.

The second side core 34 connects the first end core 31 and the second end core 32 at a position outward of the second side face 214 of the first winding portion 21. The second side face 214 is a face of the first winding portion 21 that faces the Y direction, but faces the side opposite to the first side face 213. The axial direction of the second side core 34 is parallel with the axial direction of the middle core 30. In this example, the axis of the middle core 30, the axis of the first side core 33, and the axis of the second side core 34 are arranged on the XY plane.

2.4. Division

The magnetic core 3 is constituted by a plurality of core pieces so as to enable attachment to the coil 2. The magnetic core 3 in this example is a combination of two core pieces, namely a first core piece 3A and a second core piece 3B. The first core piece 3A is constituted by the first end core 31 and a portion of the middle core 30. The first core piece 3A is approximately T-shaped in a view from the Z direction. On the other hand, the second core piece 3B is constituted by the second end core 32, the first side core 33, the second side core 34, and a portion of the middle core 30. The second core piece 3B is approximately E-shaped in a view from the Z direction. Here, the magnetic core 3 may be divided into three or more pieces as shown in a second embodiment, for example.

The sum of the X direction length of the portion of the first core piece 3A corresponding to the middle core 30 and the X direction length of the portion of the second core piece 3B corresponding to the middle core 30 is shorter than the X direction length of the first side core 33 and the X direction length of the second side core 34. Accordingly, a gap portion 3g is formed between the first core piece 3A and the second core piece 3B inside the first winding portion 21. The gap portion 3g in this example is an air gap. A gap plate (not shown) may be arranged in the gap portion 3g. In contrast to this example, the end face of the first core piece 3A and the end face of the second core piece 3B may be in contact with each other inside the first winding portion 21. In this case, a gap portion may be provided at least either between the first end core 31 and the first side core 33 or between the first end core 31 and the second side core 34.

2.5. Magnetic Characteristics, Materials, Etc.

It is preferable that the cores 30, 31, 32, 33, and 34 of the magnetic core 3 are each a powder compact formed by pressure molding a raw material powder containing a soft magnetic powder, or a compact made of a composite material including a soft magnetic powder and a resin. All of the cores 30, 31, 32, 33, and 34 may be powder compacts, or all of the cores 30, 31, 32, 33, and 34 may be composite material compacts. Also, a configuration is possible in which some of the cores 30, 31, 32, 33, and 34, are powder compacts and the rest are composite material compacts. In the case where some of the cores are powder compacts and the rest are composite material compacts, the magnetic core 3 has resistance to magnetic saturation.

The soft magnetic powder of the powder compact is an aggregate of soft magnetic particles constituted by an iron group metal such as iron, or an iron alloy such as an Fe—Si (iron-silicon) alloy or an Fe—Ni (nickel) alloy. An insulating coating made of phosphate or the like may be formed on the surfaces of the soft magnetic particles. The raw material powder may contain a lubricant or the like.

The composite material compact can be produced by filling a mold with a mixture of a soft magnetic powder and an unsolidified resin, and then solidifying the resin. The soft magnetic powder contained in the composite material can be the same as that used in the powder compact. Also, examples of the resin contained in the composite material include a thermosetting resin, a thermoplastic resin, a room temperature curing resin, and a low temperature curing resin. Examples of thermosetting resins include unsaturated polyester resin, epoxy resin, urethane resin, and silicone resin. Examples of thermoplastic resins include polyphenylene sulfide (PPS) resin, polytetrafluoroethylene (PTFE) resin, liquid crystal polymer (LCP), a polyamide (PA) resin such as nylon 6 or nylon 66, polybutylene terephthalate (PBT) resin, and acrylonitrile butadiene styrene (ABS) resin. It is also possible to use millable silicone rubber, millable urethane rubber, or a BMC (Bulk Molding Compound), which is obtained by adding calcium carbonate and glass fiber to unsaturated polyester, for example.

If the composite material contains a non-magnetic and non-metallic powder filler made of alumina, silica, or the like in addition to the soft magnetic powder and the resin, the heat dissipation characteristic can be further improved. The content of the non-magnetic and non-metal powder is 0.2% by mass or more and 20% by mass or less, 0.3% by mass or more and 15% by mass or less, or 0.5% by mass or more and 10% by mass or less, for example.

The content of the soft magnetic powder in the composite material is 30% by volume or more and 80% by volume or less, for example. From the viewpoint of improving saturation magnetic flux density and heat dissipation, the content of the soft magnetic powder can also be set to 50% by volume or more, 60% by volume or more, or 70% by volume or more. From the viewpoint of improving fluidity in the manufacturing process, it is preferable that the content of the soft magnetic powder is 75% by volume or less. The relative magnetic permeability of the composite material compact can be easily reduced by lowering the filling rate of the soft magnetic powder. The relative magnetic permeability of the composite material compact is 5 or more and 50 or less, for example. The relative magnetic permeability of the composite material compact may also be 10 or more and 45 or less, 15 or more and 40 or less, or 20 or more and 35 or less. In this example, the second core piece 3B is entirely constituted by a composite material compact.

A powder compact has a higher content of soft magnetic powder than a composite material compact. For example, the content of soft magnetic powder in a powder compact is over 80% by volume, or 85% by volume or more. A core piece made of a powder compact tends to have a high saturation magnetic flux density and a high relative magnetic permeability. The powder compact has a relative magnetic permeability of 50 or more and 500 or less, for example. The powder compact may have a relative magnetic permeability of 80 or more, 100 or more, 150 or more, or 180 or more. In this example, the entirety of the first core piece 3A including the first recessed portion 4 is constituted by a powder compact.

2.6. Size

When the reactor 1 in this example is for in-vehicle use, a length L of the magnetic core 3 in the X direction is 30 mm or more and 150 mm or less, for example, a width W of the magnetic core 3 in the Y direction is 30 mm or more and 150 mm or less, for example, and a height H in the Z direction is 15 mm or more and 75 mm or less, for example.

A length TO of the middle core 30 in the Y direction is 10 mm or more and 50 mm or less, for example. A length T1 of the first end core 31 in the X direction and a length T2 of the second end core 32 in the X direction are 5 mm or more and 40 mm or less, for example. Also, a length T3 of the first side core 33 in the Y direction and a length T4 of the second side core 34 in the Y direction are 5 mm or more and 40 mm or less, for example. These lengths are related to the magnitude of the sectional area of the magnetic path of the magnetic core 3.

3. First Recessed Portion

The first end core 31 includes the first recessed portion 4 in the first outer face 310. The first recessed portion 4 is provided in a central portion, with respect to the Y direction, of the first end core 31 in a plan view of the magnetic core 3 from the Z direction. The central portion is a region of the first end core 31 in the Y direction that is not overlapped with the side cores 33 and 34. It is preferable that the first recessed portion 4 is symmetrical about the center of the first end core 31 in the Y direction. The two closed magnetic paths formed in the magnetic core 3 in this example face directions away from the central portion in the Y direction. For this reason, magnetic flux is not likely to pass through the central portion of the first outer face 310. Accordingly, even if the first recessed portion 4 is provided in the central portion of the first outer face 310, the sectional area of the magnetic path of the first end core 31 is not likely to decrease, and the magnetic characteristics of the reactor 1 are not likely to deteriorate.

The first recessed portion 4 in this example is shaped as a groove that extends in the Z direction. The first recessed portion 4 in this example has a length extending from the upper face of the first end core 31 to the lower face of the same in the Z direction. If the first recessed portion 4 has such a length, the effect of reducing the weight of the first end core 31 is improved. In contrast to this example, a configuration is possible in which the first recessed portion 4 does not reach the upper face or the lower face of the first end core 31.

There are no particular limitations on the shape of a cross section of the first recessed portion 4 orthogonal to the extending direction thereof. In this example, a cross section of the first recessed portion 4 orthogonal to the extending direction has a rectangular shape. This cross-sectional shape is a shape defined by a bottom face 40 of the first recessed portion 4, two inner wall faces 41 and 42 of the same that face each other in the Y direction, and the opening on the outer side in the X direction. The corner portions of the rectangle may be rounded. If the cross-sectional shape of the first recessed portion 4 is rectangular, the volume of the first end core 31 can be significantly lower than in the case where the first recessed portion has a semicircular or triangular cross-sectional shape. The first core piece 3A provided with the first recessed portion 4 is a compressed powder compact that was compressed in the X direction. If the cross-sectional shape of the first recessed portion 4 is rectangular, the first core piece 3A can be easily removed from the mold. Also, since a portion of the middle core 30 is provided on the side of the first core piece 3A opposite to the first recessed portion 4, differences are not likely to arise in the compression length of the first core piece 3A in the X direction. For this reason, it is easy to produce a dense first core piece 3A. In contrast to this example, the cross-sectional shape of the first recessed portion 4 may be a trapezoid that has a wide opening. In other words, if the first recessed portion 4 has a trapezoidal cross-sectional shape, the distance between the inner wall face 41 and the inner wall face 42 of the first recessed portion 4 increases from the bottom face 40 toward the opening. The corner portions of the trapezoid may be rounded.

It is preferable that the first recessed portion 4 fits within a range corresponding to the length TO of the middle core 30 in the Y direction in a plan view of the magnetic core 3 from the Z direction. Such a first recessed portion 4 is not likely to be overlapped with a portion of the first end core 31 through which a large amount of magnetic flux passes. Accordingly, the sectional area of the magnetic path of the first end core 31 is not likely to decrease, and the magnetic characteristics of the reactor 1 are not likely to deteriorate.

It is preferable that a width W1 of the first recessed portion 4 in the Y direction is 5% or more and 50% or less of the length of the first end core 31 in the Y direction, that is to say the width W of the magnetic core 3. It is more preferable that the width W1 is 10% or more and 35% or less of the width W. In this case as well, the first recessed portion 4 is not likely to be overlapped with a portion of the first end core 31 through which a large amount of magnetic flux passes. Accordingly, the sectional area of the magnetic path of the first end core 31 is not likely to decrease, and the magnetic characteristics of the reactor 1 are not likely to deteriorate. Here, the width W1 of the first recessed portion 4 is the width of the opening of the first recessed portion 4.

The width W1 of the first recessed portion 4 in the Y direction may be 10% or more and 150% or less of the length TO of the middle core 30 in the Y direction. It is more preferable that the width W1 is 25% or more and 125% or less of the length TO. In this case as well, the first recessed portion 4 is not likely to be overlapped with a portion of the first end core 31 through which a large amount of magnetic flux passes. Accordingly, the sectional area of the magnetic path of the first end core 31 is not likely to decrease, and the magnetic characteristics of the reactor 1 are not likely to deteriorate.

On the other hand, it is preferable that the depth D1 of the first recessed portion 4 in the X direction is 10% or more and 125% or less of the length T1 of the first end core 31 in the X direction. It is more preferable that the depth D1 is 20% or more and 100% or less of the length T1. In this case as well, the first recessed portion 4 is not likely to be over-lapped with a portion of the first end core 31 through which a large amount of magnetic flux passes. Accordingly, the sectional area of the magnetic path of the first end core 31 is not likely to decrease, and the magnetic characteristics of the reactor 1 are not likely to deteriorate. Here, the depth D1 of the first recessed portion 4 is the length from the opening of the first recessed portion 4 to the deepest portion.

4. Second Recessed Portion

Here, the second end core 32 may include a second recessed portion 5, which is indicated by a dashed double-dotted line. The second recessed portion 5 has the same configuration as the first recessed portion 4. A description of the second recessed portion 5 can be obtained from the description of the first recessed portion 4 by replacing "first recessed portion 4" with "second recessed portion 5", replacing "first outer face 310" with "second outer face 320", replacing "first end core 31" with "second end core 32", and replacing "length T1" with "length T2".

5. Other Remarks

The reactor 1 may further include at least one component among a case, an adhesive layer, a holding member, and a molded resin portion. The case is a member that houses the assembly of the coil 2 and the magnetic core 3. The assembly housed in the case may be embedded in a sealing resin portion. The adhesive layer fixes the assembly to a mounting face, fixes the assembly to the inner bottom face of the case, or fixes the case to a mounting face. The holding member is a member interposed between the coil 2 and the magnetic core 3 to ensure insulation between the coil 2 and the magnetic core 3. The molded resin portion surrounds the assembly and is interposed between the coil 2 and the magnetic core 3 to integrate the coil 2 and the magnetic core 3.

6. Effects

The reactor 1 in this example having the first recessed portion 4 is lighter than a conventional reactor not having the first recessed portion 4.

In the reactor 1 in this example, the first recessed portion 4 is provided in the first end core 31 so as to reduce the amount of material constituting the first end core 31. This therefore reduces the weight of the reactor 1. Also, since the amount of material constituting the first end core 31 is reduced, it is possible to improve the productivity of the magnetic core 3, including the cost, that is to say improve the productivity of the reactor 1. Also, if the second recessed portion 5 is provided in the second end core 32, the weight of the reactor 1 is further reduced.

The reactor 1 in this example has magnetic characteristics equivalent to those of a reactor that does not have the first recessed portion 4.

In the reactor 1 in this example, the first recessed portion 4 is provided in the central portion, with respect to the Y direction, of the first outer face 310 of the first end core 31. This central portion is a portion through which magnetic flux is not likely to pass. This therefore suppresses the case where the magnetic characteristics of the reactor 1 deteriorate due to providing the first recessed portion 4 in the magnetic core 3.

Second Embodiment

Figure 3:
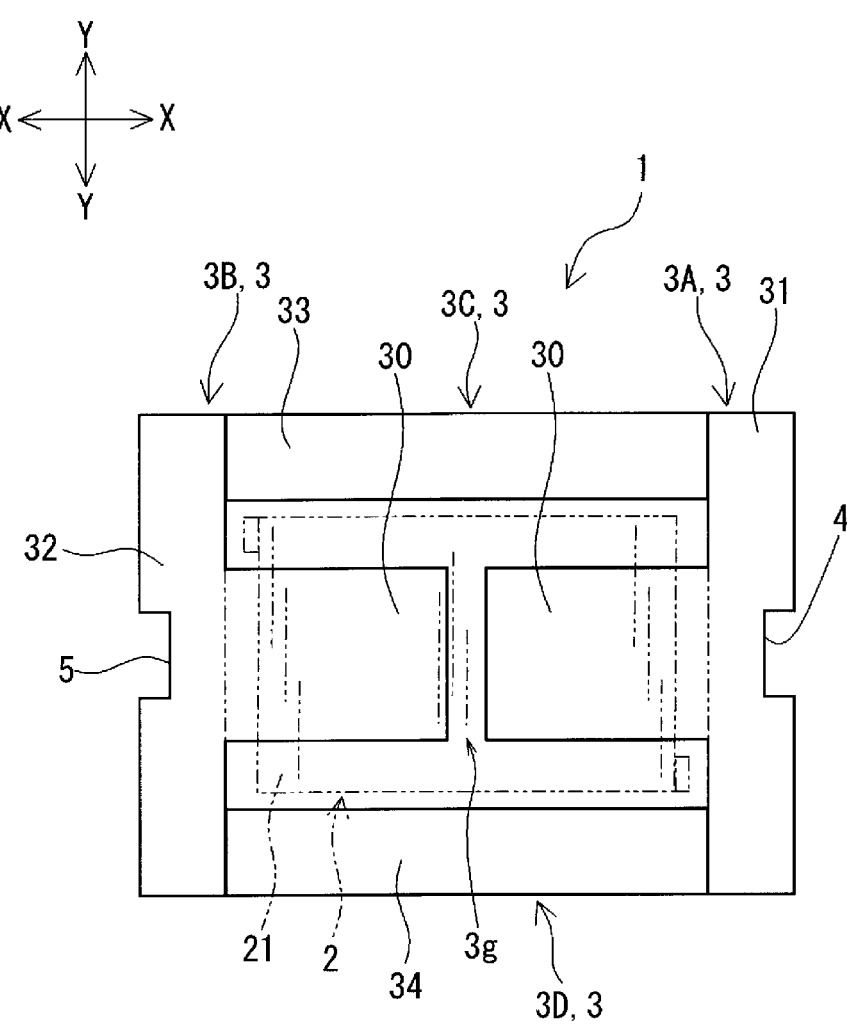
FIG. 3 is a top view of a reactor described in a second embodiment.

A reactor 1 according to a second embodiment will be described below with reference to FIG. 3. The magnetic core 3 of the reactor 1 of the second embodiment is divided differently from that of the reactor 1 of the first embodiment. Besides how the magnetic core 3 is divided, the configura-tion of the reactor 1 in this example is the same as that of the reactor 1 of the first embodiment.

The magnetic core 3 of the reactor 1 in this example is a combination of a first core piece 3A, a second core piece 3B, a third core piece 3C, and a fourth core piece 3D. The first core piece 3A in this example is constituted by a first end core 31 and a portion of the middle core 30. The first end core 31 includes a first recessed portion 4. The second core piece 3B in this example is constituted by a second end core 32 and a portion of the middle core 30. The second end core 32 includes a second recessed portion 5. The first core piece 3A and the second core piece 3B are approximately T-shaped in a view from the Z direction. The first core piece 3A and the second core piece 3B in this example have the same shape and are manufactured by one mold.

On the other hand, the third core piece 3C in this example is constituted by the first side core 33, and the fourth core piece 3D in this example is constituted by the second side core 34. The third core piece 3C and the fourth core piece 3D are approximately I-shaped in a view from the Z direction. The third core piece 3C and the fourth core piece 3D in this example have the same shape and are manufactured by one mold.

The core pieces 3A, 3B, 3C, and 3D are each a powder compact or a composite material compact. For example, the core pieces 3A and 3B are powder compacts, and the core pieces 3C and 3D are composite material compacts.

The reactor 1 in this example has effects similar to those of the reactor 1 of the first embodiment. In other words, the reactor 1 in this example is lightweight and has excellent magnetic characteristics.

Third Embodiment

Figure 4:
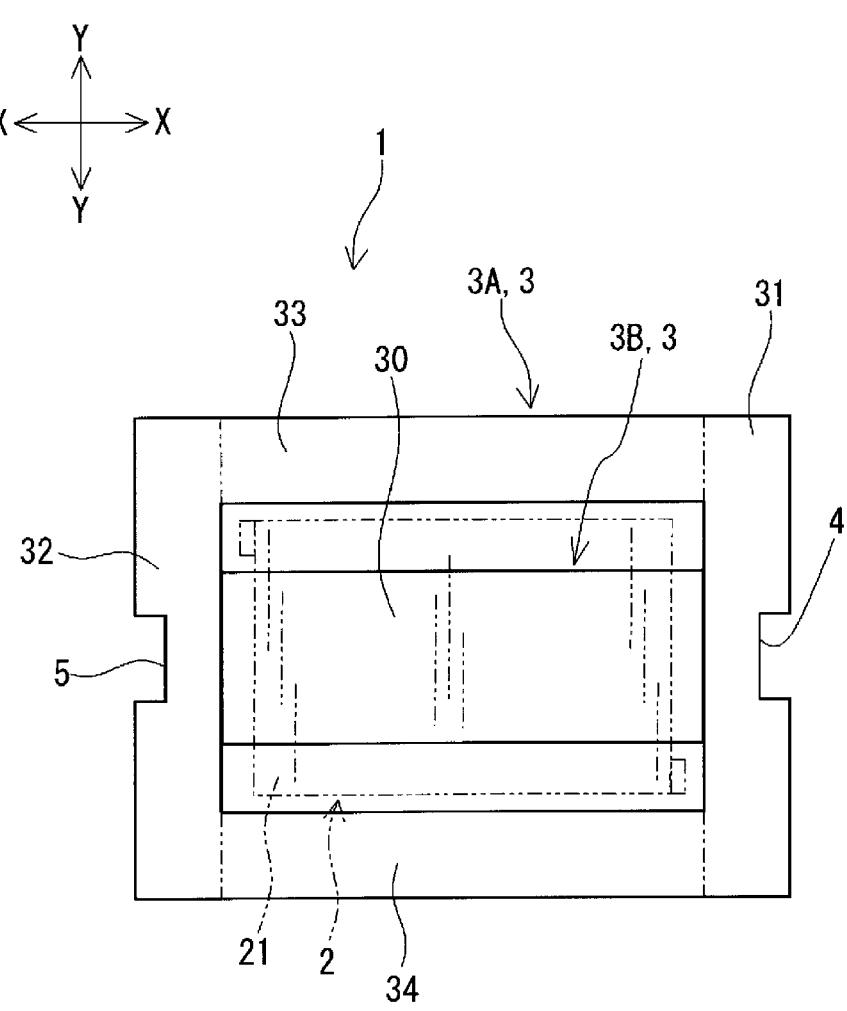
FIG. 4 is a top view of a reactor described in a third embodiment.

A reactor 1 according to a third embodiment will be described below with reference to FIG. 4. The magnetic core 3 of the reactor 1 of the third embodiment is divided differently from that of the reactor 1 of the first and second embodiments. Besides how the magnetic core 3 is divided, the configuration of the reactor 1 in this example is the same as that of the reactor 1 of the first and second embodiments.

The magnetic core 3 of the reactor 1 in this example is a combination of a first core piece 3A and a second core piece 3B. The first core piece 3A in this example is constituted by a first end core 31, a second end core 32, a first side core 33, and a second side core 34. The first end core 31 includes a first recessed portion 4. The second end core 32 includes a second recessed portion 5. The first core piece 3A is approximately O-shaped in a view from the Z direction. On the other hand, the second core piece 3B in this example is constituted by the middle core 30. The second core piece 3B is approximately I-shaped in a view from the Z direction.

The core pieces 3A and 3B are each a powder compact or a composite material compact. For example, the first core piece 3A is a powder compact and the second core piece 3B is a composite material compact.

The reactor 1 in this example has effects similar to those of the reactor 1 of the first embodiment. In other words, the reactor 1 in this example is lightweight and has excellent magnetic characteristics.

Fourth Embodiment

Figure 5:
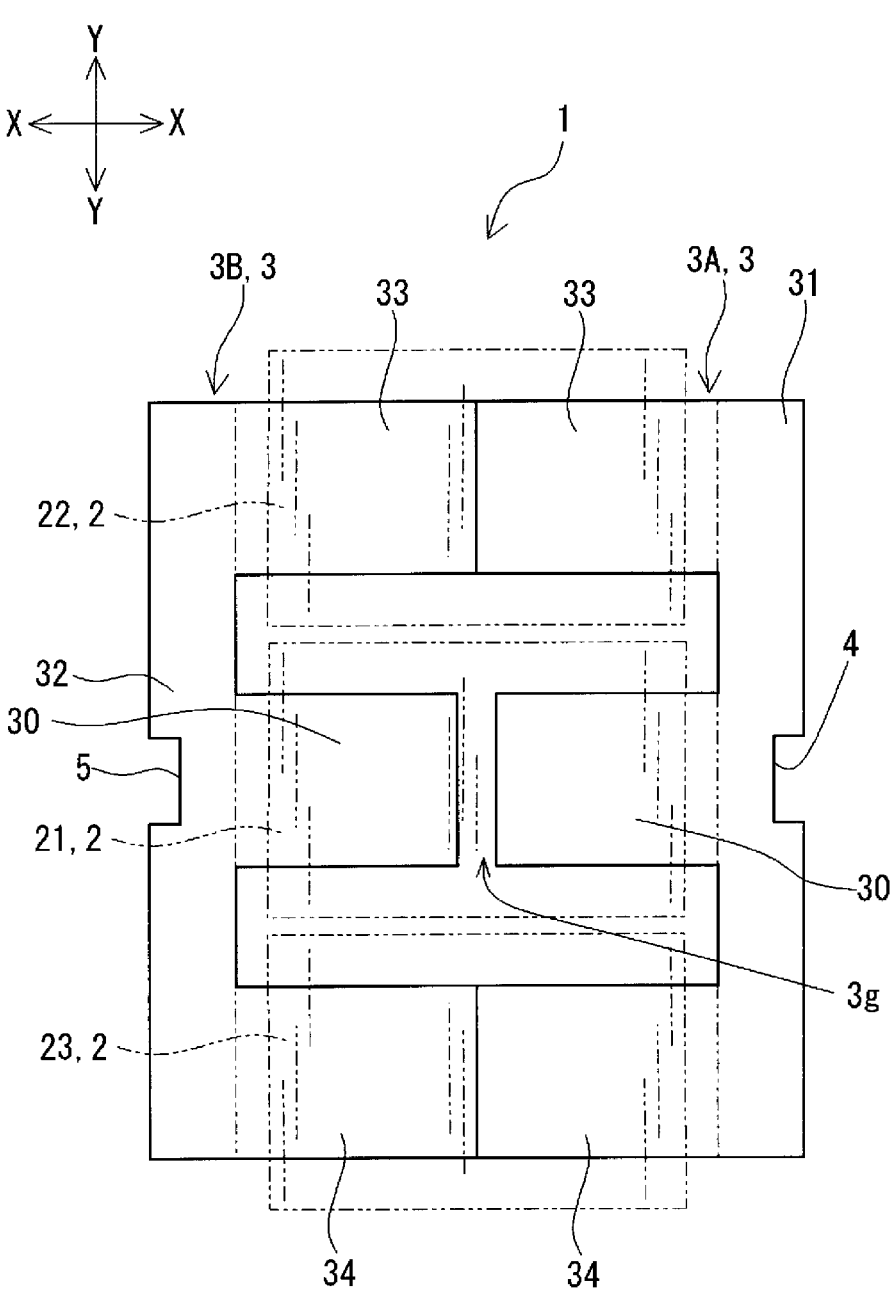
FIG. 5 is a top view of a reactor described in a fourth embodiment.

A reactor 1 provided with three winding portions 21, 22, and 23 of a fourth embodiment will be described below with reference to FIG. 5.

The coil 2 in this example includes a first winding portion 21, a second winding portion 22, and a third winding portion 23. The three winding portions 21, 22, and 23 may be continuous or independent as long as they can form a closed magnetic path as shown in FIG. 2. A middle core 30 is arranged inside the first winding portion 21, a first side core 33 is arranged inside the second winding portion 22, and a second side core 34 is arranged inside the third winding portion 23. The three winding portions 21, 22, and 22 are arranged in parallel in the Y direction, and the axes of the three winding portions 21, 22, and 23 are on the XY plane.

The magnetic core 3 in this example is a combination of a first core piece 3A and a second core piece 3B. The first core piece 3A in this example is constituted by a first end core 31, a portion of the middle core 30, a portion of the first side core 33, and a portion of the second side core 34. On the other hand, the second core piece 3B in this example is constituted by a second end core 32, a portion of the middle core 30, a portion of the first side core 33, and a portion of the second side core 34. The first core piece 3A and the second core piece 3B are approximately E-shaped in a view from the Z direction. The first core piece 3A and the second core piece 3B in this example have the same shape and are manufactured by one mold.

The core pieces 3A and 3B are each a powder compact or a composite material compact. For example, the first core piece 3A is a powder compact and the second core piece 3B is a composite material compact.

The reactor 1 in this example has effects similar to those of the reactor 1 of the first embodiment. In other words, the reactor 1 in this example is lightweight and has excellent magnetic characteristics.

Fifth Embodiment

Converter and Power Conversion Device

The reactor 1 according to the first to fourth embodiments can be used for applications that satisfy the following power conduction conditions. The power conduction conditions include, for example, that the maximum direct current is 100 A or more and 1000 A or less, the average voltage is 100 V or more and 1000 V or less, and the operating frequency is 5 kHz or more and 100 kHz or less. The reactor 1 according to the first to fourth embodiments can be typically used as a component of a converter mounted in a vehicle such as an electric automobile or a hybrid automobile, or a component of a power conversion device that includes the converter.

Figure 6:
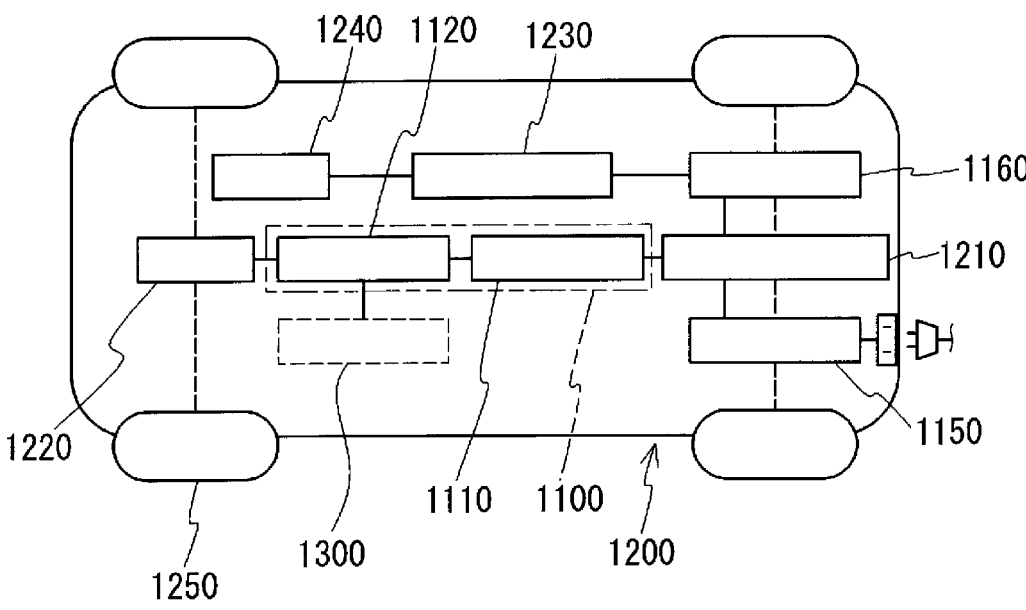
FIG. 6 is a configuration diagram schematically showing a power supply system of a hybrid automobile.

As shown in FIG. 6, a vehicle 1200 such as a hybrid automobile or an electric automobile includes a main battery 1210, a power conversion device 1100 connected to the main battery 1210, and a motor 1220 that is used for traveling and is driven by power supplied from the main battery 1210. The motor 1220 is typically a three-phase AC motor that drives wheels 1250 during travel, and functions as a generator during regeneration. In the case of a hybrid automobile, the vehicle 1200 includes an engine 1300 in addition to a motor 1220. The vehicle 1200 in FIG. 6 includes an inlet as a charging point, but can include a plug instead.

The power conversion device 1100 includes a converter 1110 connected to the main battery 1210, and an inverter 1120 that is connected to the converter 1110 and performs conversion between direct current and alternating current. During traveling of the vehicle 1200, the converter 1110 shown in this example steps up the input voltage from the main battery 1210, which is about 200 V or more and 300 V or less, to about 400 V or more and 700 V or less, and supplies the boosted power to the inverter 1120. During regeneration, the converter 1110 steps down the input voltage output from the motor 1220 via the inverter 1120 to a DC voltage suitable for the main battery 1210, and charges the main battery 1210. The input voltage is DC voltage. During traveling of the vehicle 1200, the inverter 1120 converts the DC voltage boosted by the converter 1110 into a predetermined AC voltage and supplies the power to the motor 1220, whereas during regeneration, the inverter 1120 converts AC voltage output from the motor 1220 into DC voltage and outputs the power to the converter 1110.

Figure 7:
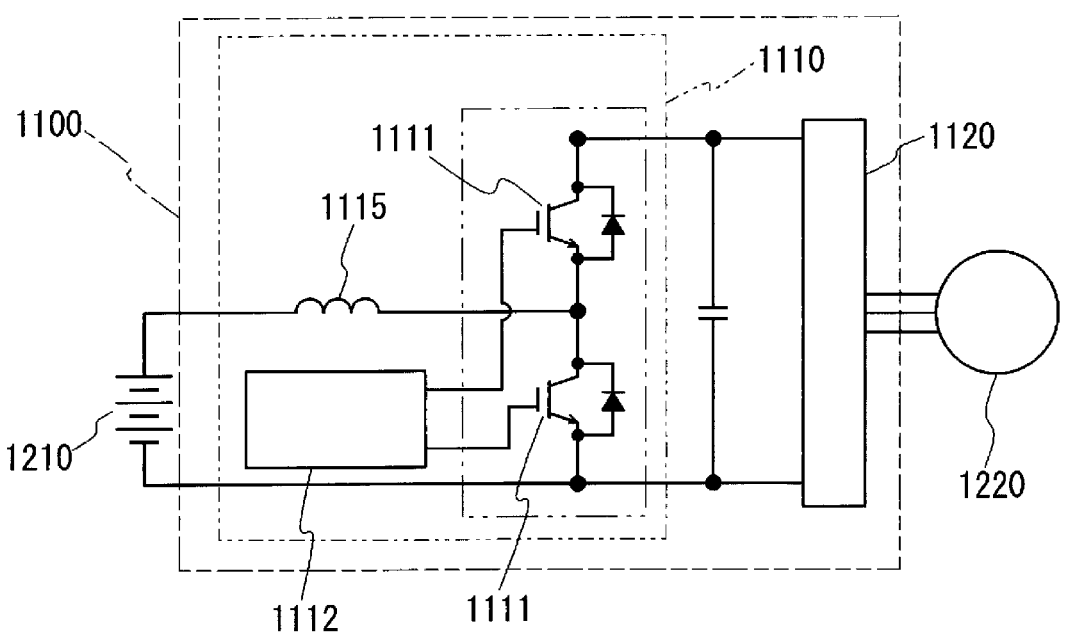
FIG. 7 is a circuit diagram schematically showing an example of a power conversion device that includes a converter.

As shown in FIG. 7, the converter 1110 includes a plurality of switching elements 1111, a drive circuit 1112 that controls the operation of the switching elements 1111, and a reactor 1115, and performs conversion of an input voltage by repeated ON/OFF operations. Here, the conversion of the input voltage is stepping up and stepping down. Power devices such as field effect transistors or insulated gate bipolar transistors are used as the switching elements 1111. The reactor 1115 utilizes the property of a coil that attempts to prevent a change in the current flowing in the circuit to achieve a function of smoothing a change in the current when the current attempts to increase or decrease due to the switching operation. The reactor 1 according to any one of the first to fourth embodiments is provided as the reactor 1115. The power conversion device 1100, the converter 1110, or the like is lightweight and has excellent conversion efficiency due to including the reactor 1 that is lightweight and has excellent magnetic characteristics.

In addition to the converter 1110, the vehicle 1200 includes a power supply device converter 1150 connected to the main battery 1210, and an auxiliary power supply converter 1160 that is connected to a sub battery 1230 (power supply for accessories 1240) and the main battery 1210 and converts a high voltage from the main battery 1210 to a low voltage. The converter 1110 typically performs DC-DC conversion, whereas the power supply device converter 1150 and the auxiliary power supply converter 1160 typically perform AC-DC conversion. Some power supply device converters 1150 perform DC-DC conversion. The reactor of the power supply device converter 1150 and the auxiliary power supply converter 1160 has the same configuration as the reactor 1 of any one of the first to fourth embodiments, and the size, shape, and the like of the reactor can be changed appropriately. Also, the reactor 1 or the like of any one of the first to fourth embodiments can be used in a converter that performs conversion on input power but only performs stepping up or stepping down.

Tests

Test Example 1

In Test Example 1, the influence of the width W1 of the first recessed portion 4 shown in FIG. 2 on the inductance and the total loss of the reactor 1 was investigated. Specifically, the reactor of Sample No. 1 not including the first recessed portion 4 and the reactor 1 of Samples No. 2 to No. 6 including the first recessed portion 4 were analyzed. The only difference between the reactor of Sample No. 1 and the reactor 1 of Samples No. 2 to No. 6 is the presence or absence of the first recessed portion 4. Also, the only difference between the reactors of Samples No. 2 and No. 6 is the width W1 of the first recessed portion 4. The dimensions of the main portions of the magnetic core 3 of each sample are as follows.

Sample No. 1

Does not include first recessed portion 4

Length L of magnetic core 3: 70 mm

Width W of magnetic core 3=width W of first end core 31 and second end core 32: 75 mm Height H of magnetic core 3: 30 mm Length T0 of middle core 30 in Y direction: 30 mm Sample No. 6

Width W1 of first recessed portion 4: 30 mm

The width W1 of the first recessed portion 4 is 40% of the width W of the magnetic core 3 and 100% of the length T0 of the middle core 30 in the Y direction.

The commercially available software JMAG-Designer 18.1 (manufactured by JSOL Corporation) was used to simulate the inductance and total loss of each sample. The inductance (pH) when a current was passed through the coil 2 was obtained in the inductance analysis. The current was changed in the range of 0 A to 300 A. Table 1 shows the inductance when the current value is 0 A, 100 A, 200 A, and 300 A. The inductance is shown as a percentage relative to an inductance of 100% for Sample No. 1 at 0 A.

In the total loss analysis, the total loss (W) was obtained based on the magnetic flux density distribution and the current density distribution when driven at a direct current of 0 A, an input voltage of 200 V, an output voltage of 400 V, and a frequency of 20 kHz. The total loss in this example includes iron loss of the magnetic core 3, coil loss, and the like. The results are shown in Table 1. The total loss is shown as a percentage relative to a total loss of 100% for Sample No. 1.

Table 1 also shows the volume reduction amount ($mm^3$) of the magnetic core 3 due to the provision of the first recessed portion 4.

TABLE 1

| Item | Unit | Sample No. | | | | | |
| | | No. 1 | No. 2 | No. 3 | No. 4 | No. 5 | No. 6 |
| --- | --- | --- | --- | --- | --- | --- | --- |
| Width W1 of first recessed portion | mm | 0 | 6 | 12 | 18 | 24 | 30 |
| Inductance 0 A | % | 100 | 99.97 | 99.93 | 99.86 | 99.78 | 99.64 |
| 100 A | | | 79.43 | 79.40 | 79.35 | 79.22 | 78.97 | 78.56 |
| 200 A | | | 55.71 | 55.67 | 55.54 | 55.18 | 54.55 | 53.80 |
| 300 A | | | 33.42 | 33.40 | 33.31 | 33.14 | 33.08 | 32.88 |
| Total loss | % | 100 | 100.15 | 100.44 | 100.99 | 101.68 | 102.55 |
| Volume reduction | $mm^3$ | — | 720 | 1440 | 2160 | 2880 | 3600 |

Lengths T1 and T2 of first end core 31 and second end core 32 in X direction: 12 mm Lengths T3 and T4 of first side core 33 and second side core 34 in Y direction: 11 mm Sample No. 2

Width W1 of first recessed portion 4: 6 mm

The width W1 of the first recessed portion 4 is 8% of the width W of the magnetic core 3 and 20% of the length T0 of the middle core 30 in the Y direction.

Depth D1 of first recessed portion 4: 4 mm

Length of first recessed portion 4 in Z direction: 30 mm

Sample No. 3

Width W1 of first recessed portion 4: 12 mm

The width W1 of the first recessed portion 4 is 16% of the width W of the magnetic core 3 and 40% of the length T0 of the middle core 30 in the Y direction.

Sample No. 4

Width W1 of first recessed portion 4: 18 mm

The width W1 of the first recessed portion 4 is 24% of the width W of the magnetic core 3 and 60% of the length T0 of the middle core 30 in the Y direction.

Sample No. 5

Width W1 of first recessed portion 4: 24 mm

The width W1 of the first recessed portion 4 is 32% of the width W of the magnetic core 3 and 80% of the length T0 of the middle core 30 in the Y direction.

As shown in Table 1, compared with the reactor of Sample No. 1 serving as the base model, as the width W1 of the first recessed portion 4 increase and as the volume reduction amount of the magnetic core 3 increases, the inductance of the reactor 1 tends to decrease, and the total loss tends to increase. In other words, there is a trade-off relationship between reduction of the weight of the reactor 1 and the magnetic characteristics of the reactor 1. However, since the first recessed portion 4 is located in a central portion of the first outer face 310 of the first end core 31, the decrease in inductance and the increase in total loss are insignificant. Here, from the viewpoint of maintaining the magnetic characteristics of the reactor 1, it is preferable that the rate of decrease in inductance and the rate of increase in total loss due to the provision of the first recessed portion 4 are 1% or less. From this point of view, it can be said that Sample No. 3 and Sample No. 4 have a good balance between volume reduction amount and the extent of deterioration of magnetic characteristics. In other words, it is preferable that the width W1 of the first recessed portion 4 is about 12 mm or more and 18 mm or less.

Furthermore, in order to investigate the relationship between the width W1 of the first recessed portion 4 and the extent of change in the magnetic characteristics of the reactor 1, the deterioration rate of inductance performance and the deterioration rate of total loss were investigated as shown below. These deterioration rates are unique indicators in this specification.

Deterioration Rate of Inductance Performance (deterioration rate of inductance performance)=(decrease in inductance)/(volume reduction amount of magnetic core)

Here, the amount of decrease in inductance in the above expression is the sum of the difference in inductance from the base model when the current value is 0 A, the difference in inductance from the base model when the current value is 100 A, the difference in inductance from the base model when the current value is 200 A, and the difference in inductance from the base model when the current value is 300 A. For example, the amount of decrease in inductance of Sample No. 2 based on the results in Table 1 is |100–99.97|+|79.43–79.40|+|55.7|–55.67|+β3.42–33.40|=0.12.

Figure 8:
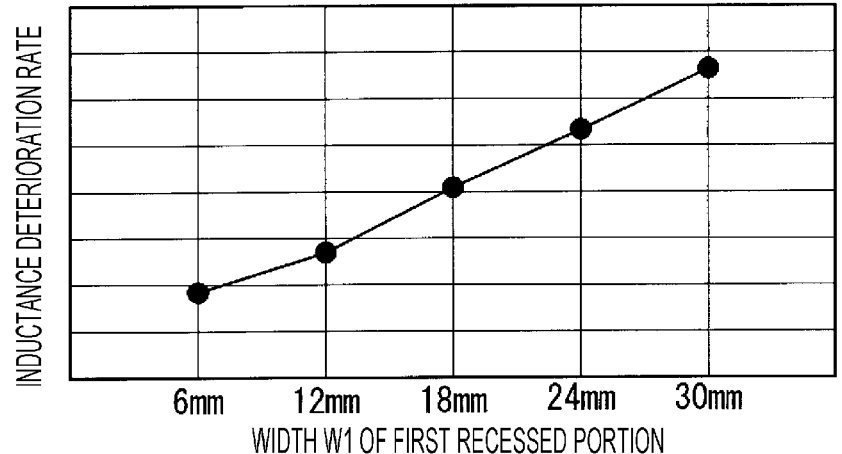
FIG. 8 is a graph showing the relationship between the width of a first recessed portion and the deterioration rate of inductance in Test Example 1.

The deterioration rate of inductance of Samples No. 2 to No. 6 is shown in the graph of FIG. 8. The horizontal axis of the graph indicates the width W1 (mm) of the first recessed portion 4, and the vertical axis indicates the deterioration rate of inductance performance. In the graph of FIG. 8, the plotted points of the samples are connected by lines. When the slope of the line between the plotted points shown in FIG. 8 is small, it can be said that the rate of deterioration of inductance performance relative to an increase in the width W1 is small Deterioration Rate of Total Loss (deterioration rate of total loss)=(increase in total loss)/(volume reduction amount of magnetic core)

Here, the amount of increase in total loss in the above equation is the difference in total loss from the base model. For example, the increase in total loss of Sample No. 2 based on the results in Table 1 is 100.15-100.00=0.15.

Figure 9:
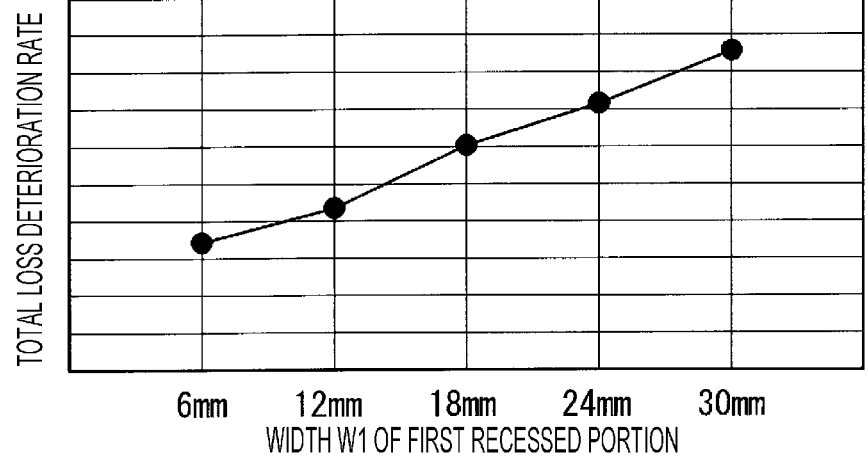
FIG. 9 is a graph showing the relationship between the width of the first recessed portion and the deterioration rate of total loss in Test Example 1.

The deterioration rate of total loss of Samples No. 2 to No. 6 is shown in the graph of FIG. 9. The horizontal axis of the graph indicates the width W1 (mm) of the first recessed portion 4, and the vertical axis indicates the deterioration rate of total loss. In the graph of FIG. 9, the plotted points of the samples are connected by lines. When the slope of the viewpoint of reducing the weight of the magnetic core 3, the width W1 of the first recessed portion 4 may be 18 mm or more and 24 mm or less.

Test Example 2

In Test Example 2, the influence of the depth D1 of the first recessed portion 4 shown in FIG. 2 on the inductance and the total loss of the reactor 1 was investigated. Specifically, the reactor of Sample No. 1 not including the first recessed portion 4 and the reactor 1 of Samples No. 7 to No. 11 including the first recessed portion 4 were analyzed. The reactor of Sample No. 1 is the same as the reactor of Sample No. 1 of Test Example 1. The only difference between the reactor 1 of Samples No. 7 to No. 11 is the depth D1 of the first recessed portion 4. The dimensions of the main portions of the magnetic core 3 of each sample are as follows.

Sample No. 7

Depth D1 of first recessed portion 4: 2 mm

The depth D1 of first recessed portion 4 is 16% f the length T1 of the first end core 31 in the X direction.

Width W1 of first recessed portion 4: 12 mm

Length of first recessed portion 4 in Z direction: 30 mm

Sample No. 8

Depth D1 of first recessed portion 4: 4 mm

The depth D1 of the first recessed portion 4 is 33% of the length T1 of the first end core 31 in the X direction.

Sample No. 9

Depth D1 of first recessed portion 4: 6 mm

The depth D1 of the first recessed portion 4 is 50% of the length T1 of the first end core 31 in the X direction.

Sample No. 10

Depth D1 of first recessed portion 4: 8 mm

The depth D1 of the first recessed portion 4 is 66% of the length T1 of the first end core 31 in the X direction.

Sample No. 11

Depth D1 of first recessed portion 4: 10 mm

The depth D1 of the first recessed portion 4 is 83% of the length T1 of the first end core 31 in the X direction.

The inductance and total loss of each sample were determined by the same method as in Test Example 1. The results are shown in Table 2.

TABLE 2

| Item | Unit | Sample No. | | | | | |
|---|---|---|---|---|---|---|---|
| | | No. 1 | No. 7 | No. 8 | No. 9 | No. 10 | No. 11 |
| Depth D1 of first recessed portion | mm | 0 | 2 | 4 | 6 | 8 | 10 |
| Inductance          0 A | % | 100 | 99.96 | 99.93 | 99.88 | 99.82 | 99.75 |
| 100 A | | | 79.43 | 79.39 | 79.35 | 79.26 | 79.13 | 78.93 |
| 200 A | | | 55.71 | 55.66 | 55.54 | 55.29 | 54.89 | 54.34 |
| 300 A | | | 33.42 | 33.39 | 33.31 | 33.17 | 33.05 | 32.93 |
| Total loss | % | 100 | 100.18 | 100.44 | 100.92 | 101.45 | 102.17 |
| Volume reduction | mm$^3$ | — | 720 | 1440 | 2160 | 2880 | 3600 | line between the plotted points shown in FIG. 9 is small, it can be said that the rate of deterioration of total loss relative to an increase in the width W1 is small.

As shown in FIGS. 8 and 9, the slope of the line connecting Sample No. 4 with a width W1 of 18 mm and Sample No. 5 with a width W1 of 24 mm is smaller than the slope of the other lines. Accordingly, it can be said that the extent of deterioration of the magnetic characteristics of the reactor 1 is comparatively moderate when the width W1 is in the range of 18 mm to 24 mm. Accordingly, from the As shown in Table 2, compared with the reactor of Sample No. 1 serving as the base model, as the depth D1 of the first recessed portion 4 increases, that is to say as the volume reduction amount of the magnetic core 3 increases, the inductance of the reactor 1 tends to decrease, and the total loss tends to increase. However, since the first recessed portion 4 is located in a central portion of the first outer face 310 of the first end core 31, the decrease in inductance and the increase in total loss are insignificant. However, from the viewpoint of maintaining the magnetic characteristics of the reactor 1, it is preferable that the rate of decrease in inductance and the rate of increase in total loss due to the provision of the first recessed portion 4 are 1% or less. From this point of view, it can be said that Sample No. 8 and Sample No. 9 have a good balance between the volume reduction amount and the extent of deterioration of magnetic characteristics. In other words, it is preferable that the depth D1 of the first recessed portion 4 is about 4 mm or more and 6 mm or less.

Furthermore, in order to investigate the relationship between the depth D1 of the first recessed portion 4 and the extent of change in the magnetic characteristics of the reactor 1, the deterioration rate of inductance and the deterioration rate of total loss of each sample were investigated. The definitions of both deterioration rates are the same as the definitions of the deterioration rates in Test Example 1. The results are shown in FIGS. 10 and 11.

Figure 10:
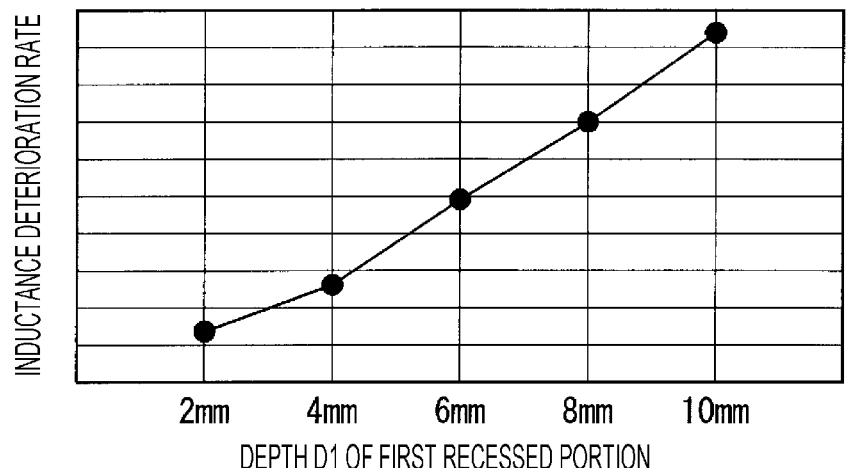
FIG. 10 is a graph showing the relationship between the depth of the first recessed portion and the deterioration rate of inductance in Test Example 2.

FIG. 10 is a graph showing the deterioration rate of inductance of Samples No. 7 to No. 11. The horizontal axis of the graph in FIG. 10 indicates the depth D1 (mm) of the first recessed portion 4, and the vertical axis indicates the rate of deterioration of inductance. FIG. 11 is a graph showing the deterioration rate of total loss of Samples No. 7 to No. 11. The horizontal axis of the graph indicates the depth D1 (mm) of the first recessed portion 4, and the vertical axis indicates the deterioration rate of total loss. In the graphs of FIGS. 10 and 11, the plotted points of the samples are connected by lines.

Figure 11:
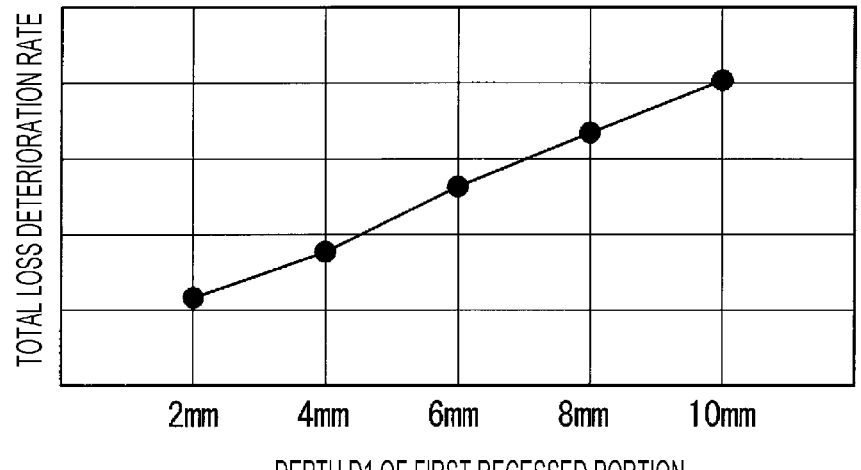
FIG. 11 is a graph showing the relationship between the depth of the first recessed portion and the deterioration rate of total loss in Test Example 2.

When the slope of the line between the plotted points shown in FIGS. 10 and 11 is small, it can be said that the rate of deterioration of inductance and total loss relative to an increase in the depth D1 is small. As shown in FIGS. 10 and 11, the slope of the line connecting Sample No. 9 with a depth D1 of 6 mm and Sample No. 10 with a depth D1 of 8 mm is smaller than the slope of the other lines. Accordingly, it can be said that the rate of deterioration of the magnetic characteristics of the reactor 1 is comparatively moderate when the depth D1 is in the range of 6 mm to 8 mm. Accordingly, from the viewpoint of reducing the weight of the magnetic core 3, the depth D1 of the first recessed portion 4 may be 6 mm or more and 8 mm or less.

Test Example 3

In Test Example 3, it was investigated whether the rate of decrease in magnetic characteristics due to the provision of the first recessed portion 4 is different according to whether the magnetic core 3 is a powder compact or a composite material. The characteristics of the samples are as follows. The dimensions L, W, H, T0, T1, T2, T3, and T4 of the magnetic core 3 of each sample are the same as in Sample No. 1 of Test Example 1.

Sample No. 20
 Magnetic core 3 is entirely a powder compact.
 Does not include first recessed portion 4.
Sample No. 21
 Magnetic core 3 is entirely a powder compact.
 Includes first recessed portion 4.
 Width W1 of first recessed portion 4: 12 mm
 Depth D1 of first recessed portion 4: 4 mm
Sample No. 22
 Magnetic core 3 is entirely a composite material.
 Does not include first recessed portion 4.
Sample No. 23
 Magnetic core 3 is entirely a composite material.
 Includes first recessed portion 4.
 Width W1 of first recessed portion 4: 12 mm
 Depth D1 of first recessed portion 4: 4 mm The inductance and the total loss of Samples No. 20 to No. 23 were measured. The measurement method is the same as in Test Example 1. The measurement results are shown in Table 3. The inductance in Table 3 is shown as a percentage relative to an inductance of 100% for Sample No. 20 at 0 A. The total loss in Table 3 is shown as a percentage relative to a total loss of 100% for Sample No. 20. In the columns for Sample No. 21 and Sample No. 23 in Table 3, the deterioration rates relative to Sample No. 20 and Sample No. 22 are shown as a percentage in parentheses. When the rate of deterioration of inductance is negative, it can be considered that the magnetic characteristics of the reactor 1 have deteriorated. When the rate of change in total loss is positive, it can be considered that the magnetic characteristics of the reactor 1 have deteriorated.

TABLE 3

| Item | Unit | Sample No. | | | |
| | | No. 20 | No. 21 | No. 22 | No. 23 |
| --- | --- | --- | --- | --- | --- |
| Inductance | 0 A % | 100.0 | 99.81 (−0.2%) | 12.99 | 12.94 (−0.4%) |
| | 100 A | 12.97 | 12.89 (−0.7%) | 10.95 | 10.91 (−0.4%) |
| | 200 A | 7.16 | 7.13 (−0.5%) | 8.64 | 8.61 (−0.3%) |
| | 300 A | 3.69 | 3.69 (−0.1%) | 6.19 | 6.19 (−0.1%) |
| Total loss | % | 10.00 | 100.33 (+0.3%) | 104.62 | 105.68 (+1.0%) |

As shown in Table 3, the deterioration rate of Sample No. 21 in which the magnetic core 3 was made of a powder compact was smaller than the deterioration rate of Sample No. 23 in which the magnetic core 3 was made of a composite material. Accordingly, if the first recessed portion 4 is provided in the first end core 31, it is preferable that the first end core 31 is a powder compact.

LIST OF REFERENCE NUMERALS 1 reactor
2 coil
 21 first winding portion, 22 second winding portion, 23 third winding portion, 2a, 2b end portion
 211 first end face, 212 second end face
 213 first side face, 214 second side face
3 magnetic core
 3g gap portion
 3A first core piece, 3B second core piece, 3C third core piece, 3D fourth core piece
 30 middle core, 31 first end core, 32 second end core
 33 first side core, 34 second side core
 310 first outer face, 320 second outer face
4 first recessed portion
 40 bottom face, 41, 42 inner wall face
5 second recessed portion
1100 power conversion device
 1110 converter, 1111 switching element, 1112 drive circuit
 1115 reactor, 1120 inverter
 1150 power supply device converter, 1160 auxiliary power supply converter
1200 vehicle
 1210 main battery, 1220 motor, 1230 sub battery
 1240 accessory, 1250 wheel
 1300 engine D1 depth
H height
L, T0, T1, T2, T3, T4 length
W, W1 width

What is claimed is:
1. A reactor comprising:
a coil including a first winding portion; and
a magnetic core,
wherein the magnetic core includes:
    a middle core arranged inside the first winding portion,
    a first end core facing a first end face of the first winding portion,
    a second end core facing a second end face of the first winding portion,
    a first side core that is arranged outward of a first side face of the first winding portion and connects the first end core and the second end core, and
    a second side core that is arranged outward of a second side face of the first winding portion and connects the first end core and the second end core,
the first end core includes:
    a first outer face separated from the first end face in an X direction, and
    a first recessed portion provided in the first outer face,
a cross-section of the first recessed portion orthogonal to a Z direction has a rectangular shape,
in a plan view of the magnetic core from the Z direction, the first recessed portion is located in a central portion of the first end core with respect to a Y direction,
in a plan view of the magnetic core from the Z direction, a width of the first recessed portion in the Y direction, which is defined as a width of an opening of the first recessed portion between two inner wall faces facing each other in the Y direction, is 40% or more and 80% or less of a length of the middle core in the Y direction, and a depth of the first recessed portion in the X direction, which is defined as a distance from the opening of the first recessed portion to a bottom face thereof, is 50% or more and 66% or less of a length of the first end core in the X direction,
the X direction is a direction conforming to an axial direction of the middle core,
the Y direction is a direction in which the middle core, the first side core, and the second side core are side-by-side, and
the Z direction is a direction orthogonal to the X direction and the Y direction.
2. The reactor according to claim 1,
wherein in a plan view of the magnetic core from the Z direction, the first recessed portion fits within a range corresponding to the length of the middle core in the Y direction.
3. The reactor according to claim 1,
wherein the first recessed portion is shaped as a groove extending along the Z direction.
4. The reactor according to claim 1,
wherein the magnetic core includes a plurality of core pieces, one of the core pieces is a first core piece that includes at least the first end core, and
the first core piece is a powder compact made of a raw material powder that contains a soft magnetic powder.
5. A reactor comprising:
a coil including a first winding portion; and
a magnetic core,
wherein the magnetic core includes:
    a middle core arranged inside the first winding portion, a first end core facing a first end face of the first winding portion,
    a second end core facing a second end face of the first winding portion,
    a first side core that is arranged outward of a first side face of the first winding portion and connects the first end core and the second end core, and
    a second side core that is arranged outward of a second side face of the first winding portion and connects the first end core and the second end core,
the first end core includes:
    a first outer face separated from the first end face in an X direction, and
    a first recessed portion provided in the first outer face,
a cross-section of the first recessed portion orthogonal to a Z direction has a rectangular shape,
in a plan view of the magnetic core from the Z direction, the first recessed portion is located in a central portion of the first end core with respect to a Y direction, in a plan view of the magnetic core from the Z direction, a width of the first recessed portion in the Y direction, which is defined as a width of an opening of the first recessed portion between two inner wall faces facing each other in the Y direction, is 5% or more and 50% or less of a length of the first end core in the Y direction, and a depth of the first recessed portion in the X direction, which is defined as a distance from the opening of the first recessed portion to a bottom face thereof, is 50% or more and 66% or less of a length of the first end core in the X direction,
the X direction is a direction conforming to an axial direction of the middle core,
the Y direction is a direction in which the middle core, the first side core, and the second side core are side-by-side, and
the Z direction is a direction orthogonal to the X direction and the Y direction.
6. The reactor according to claim 1,
wherein the second end core includes:
    a second outer face separated from the second end face in the X direction, and
    a second recessed portion provided in the second outer face, and
in a plan view of the magnetic core from the Z direction, the second recessed portion is provided in a central portion of the second end core with respect to the Y direction.
7. The reactor according to claim 1,
wherein the coil further includes a second winding portion and a third winding portion,
the first side core is arranged inside the second winding portion, and
the second side core is arranged inside the third winding portion.
8. A converter comprising the reactor according to claim 1.
9. A power conversion device comprising the converter according to claim 8.
10. The reactor according to claim 4,
wherein another of the core pieces is a second core piece that includes at least the second end core, and
a gap portion is formed between the first core piece and the second core piece inside the first winding portion.
11. The reactor according to claim 1,
wherein the first end core and the second end core have a larger width in the Y direction than the first winding portion.

12. The reactor according to claim 1,
wherein the first end core and the second end core have a
substantially rectangular parallelepiped shape.

* * * * *